(12) United States Patent
Schwartz et al.

(10) Patent No.: US 7,582,004 B2
(45) Date of Patent: Sep. 1, 2009

(54) COOLANT NOZZLE

(75) Inventors: Brian J. Schwartz, West Hartford, CT (US); Robert N. Davie, Jr., East Haddam, CT (US); Bernard D. Vaillette, Tolland, CT (US); Jon C. Hammett, Windham, CT (US); Allan B. Packman, West Hartford, CT (US); Timothy L. Brown, Colchester, CT (US); James D. Campbell, Jr., East Hampton, CT (US)

(73) Assignee: United Technologies Corporation, Hartford, CT (US)

( * ) Notice: Subject to any disclaimer, the term of this patent is extended or adjusted under 35 U.S.C. 154(b) by 534 days.

(21) Appl. No.: 10/618,059

(22) Filed: Jul. 11, 2003

(65) Prior Publication Data

US 2005/0005751 A1 Jan. 13, 2005

(51) Int. Cl.
*B24B 55/02* (2006.01)
*B23B 51/06* (2006.01)
*B23Q 11/10* (2006.01)

(52) U.S. Cl. .................. 451/449; 451/446; 408/61; 409/136

(58) Field of Classification Search ................ 451/499, 451/446, 450, 99, 490, 466; 408/60, 61, 408/67; 409/135, 136
See application file for complete search history.

(56) References Cited

U.S. PATENT DOCUMENTS

| 4,252,768 | A | * | 2/1981 | Perkins et al. | ............... 264/332 |
| 4,798,505 | A | | 1/1989 | Ameseder | |
| 4,863,538 | A | | 9/1989 | Deckard | |
| 5,332,341 | A | * | 7/1994 | Arai et al. | ...................... 408/61 |
| 5,332,343 | A | * | 7/1994 | Watanabe et al. | ........... 409/136 |
| 5,544,986 | A | * | 8/1996 | Kudo et al. | ................... 408/67 |
| 6,382,887 | B1 | * | 5/2002 | Nakai | ......................... 409/136 |
| 6,471,573 | B1 | * | 10/2002 | Reitmeyer | .................. 451/449 |

FOREIGN PATENT DOCUMENTS

| DE | 1566274 A1 | | 10/1969 |
| DE | 20216396 U | * | 1/2003 |
| DE | 20216396 U1 | | 1/2003 |
| JP | 3-68766 | | 7/1991 |
| JP | 11-320325 | | 11/1999 |

* cited by examiner

*Primary Examiner*—Hadi Shakeri
(74) *Attorney, Agent, or Firm*—Bachman & LaPointe, P.C.

(57) ABSTRACT

A coolant nozzle is used in a machine tool having a rotating bit. The nozzle includes a through-aperture for accommodating the bit. The nozzle has a coolant inlet and a number of coolant outlets at more than one angular position about the through-aperture. Internal surface portions define one or more passageways between the inlet and the outlets.

20 Claims, 6 Drawing Sheets

COOLANT NOZZLE

U.S. GOVERNMENT RIGHTS

The invention was made with U.S. Government support under contract no. N0001902C3003 awarded by the U.S. Navy. The U.S. Government has certain rights in the invention.

BACKGROUND OF THE INVENTION (1) Field of the Invention

The invention relates to machining. More particularly, the invention relates to superabrasive machining of metal alloy articles.

(2) Description of the Related Art

Apparatus for point and flank superabrasive machining (SAM) of turbomachine components are respectively shown in U.S. patent applications Ser. Nos. 10/289,493 and 10/400,937, respectively filed Nov. 6, 2002 and Mar. 27, 2003. The disclosures of the '493 and '937 applications are incorporated by reference herein as if set forth at length. It is important to provide fluid coolant/lubricant (e.g., oil or water-based materials) to maintain machining effectiveness.

SUMMARY OF THE INVENTION

One aspect of the invention involves a coolant nozzle for use on a machine tool having a rotating bit. The nozzle comprises at least one coolant inlet and at least one coolant outlet. Internal surface portions define one or more passageways between the inlet and the outlet. An aperture accommodates the bit.

In various implementations, the internal surface portions may be formed in a laser sintered ceramic body. The passageways may include a plenum surrounding the aperture. There may be a number of outlets symmetric around an axis. There may be a number of outlets positioned to direct associated coolant outlet streams toward an axis of the bit when the bit is in an installed position. The outlets may be elongate. There may be at least five outlets and a single inlet. The aperture may have a diameter of less than three centimeters. The nozzle may be in combination with the machine tool and bit and a number of coolant outlet streams may exit the outlets and impact obliquely along a side of the bit.

Another aspect of the invention involves a coolant nozzle for use in a machine tool having a rotating bit. The nozzle includes a through-aperture for accommodating the bit. The nozzle has a coolant inlet and a number of coolant outlets at more than one angular position about the through-aperture. Internal surface portions define one or more passageways between the coolant inlet and the coolant outlets.

In various implementations, the coolant outlets may each be at a common radial position relative to an axis and at a unique angular position about the axis. There may be no other coolant outlets in addition to the coolant outlets.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
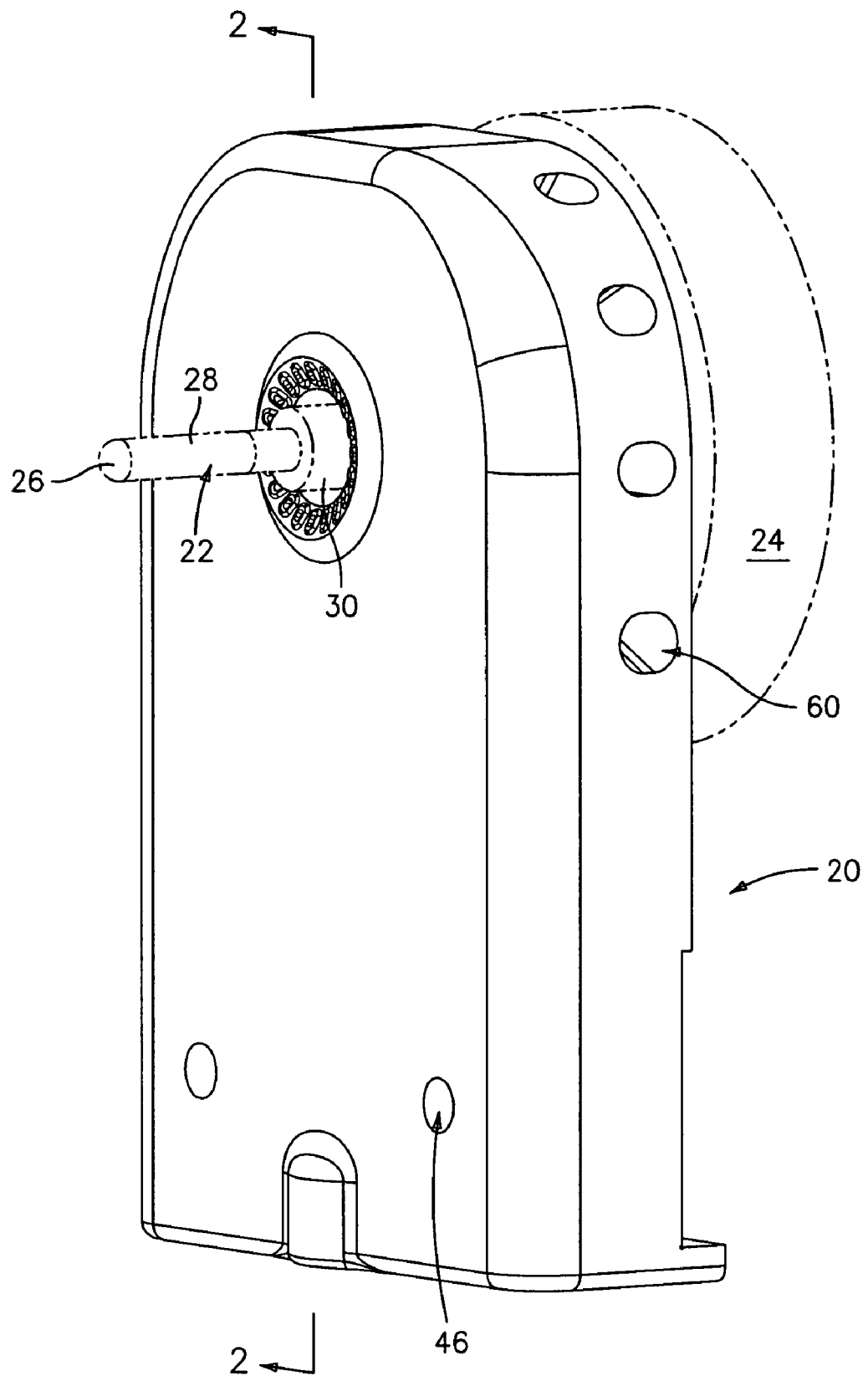
FIG. 1 is a view of a nozzle according to principles of the invention.
Figure 2:
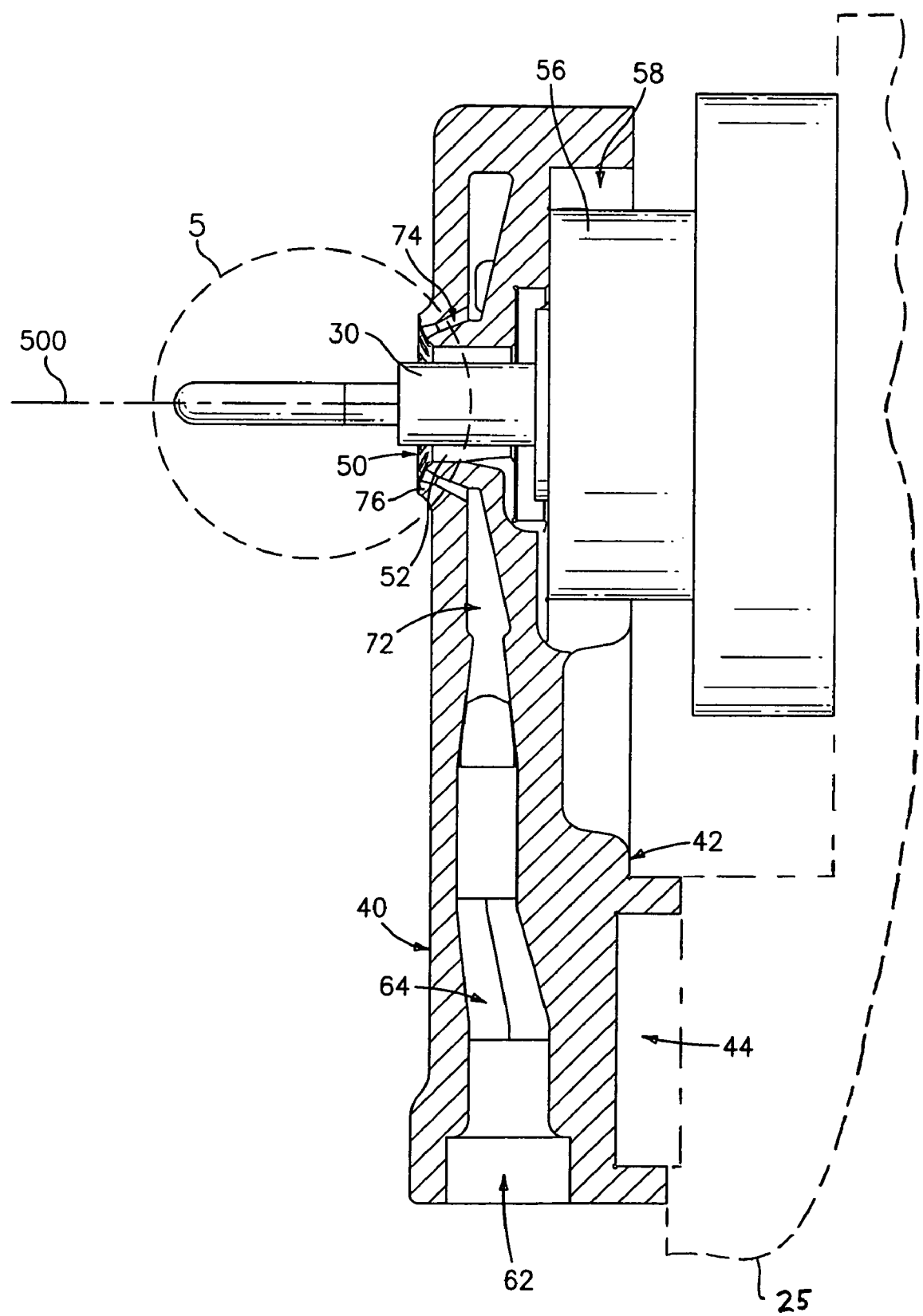
FIG. 2 is a vertical sectional view of the nozzle of FIG. 1 taken along line 1-1.

FIG. 1 shows a nozzle 20 for lubricating/cooling a bit 22 held by a spindle 24 of a machine tool 25 (FIG. 2). An exemplary bit is a superabrasive quill. The bit has a shaft with a distal doubly convex (e.g., hemispherical) head 26 and distal shaft portion 28 which have an abrasive coating or embedded abrasive particles (e.g., plated cubic boron nitride or diamond grit). The bit has an intermediate enlarged portion 30 having flats (not shown) for gripping by a tool and a proximal portion (not shown) for mounting the bit to the spindle. The nozzle has a front surface 40 (FIG. 2) and a back surface 42. The back surface may include features (e.g., a channel 44) for mating to complementary features of the machine tool front to register the nozzle in an operative position in precise alignment with the machine tool. Securing means may be provided such as mounting apertures 46 (FIG. 1) for receiving studs protruding from the machine tool or fasteners extending into the machine tool to removably secure the nozzle registered in the operative position. Alternatively, a clamping mechanism may be used in conjunction with an automated tool changer. In the operative position the nozzle has an aperture 50 encircling a central longitudinal axis 500 of the spindle and bit. The aperture is, in principal part, defined by an internal surface 52 in close spaced part relation to the bit intermediate portion 30 (e.g., with a radial clearance of up to about 1 cm, more narrowly 5 mm). In the exemplary embodiment, a forward portion 56 of the spindle is received within a recess 58 in the nozzle aft surface. In the exemplary embodiment, the recess 58 surrounds the spindle forward portion with an appropriate radial clearance and is connected via passageways 60 (FIG. 1) to the nozzle lateral periphery. The passageways 60 permit passage of cooling air to reach the spindle.

Figure 3:
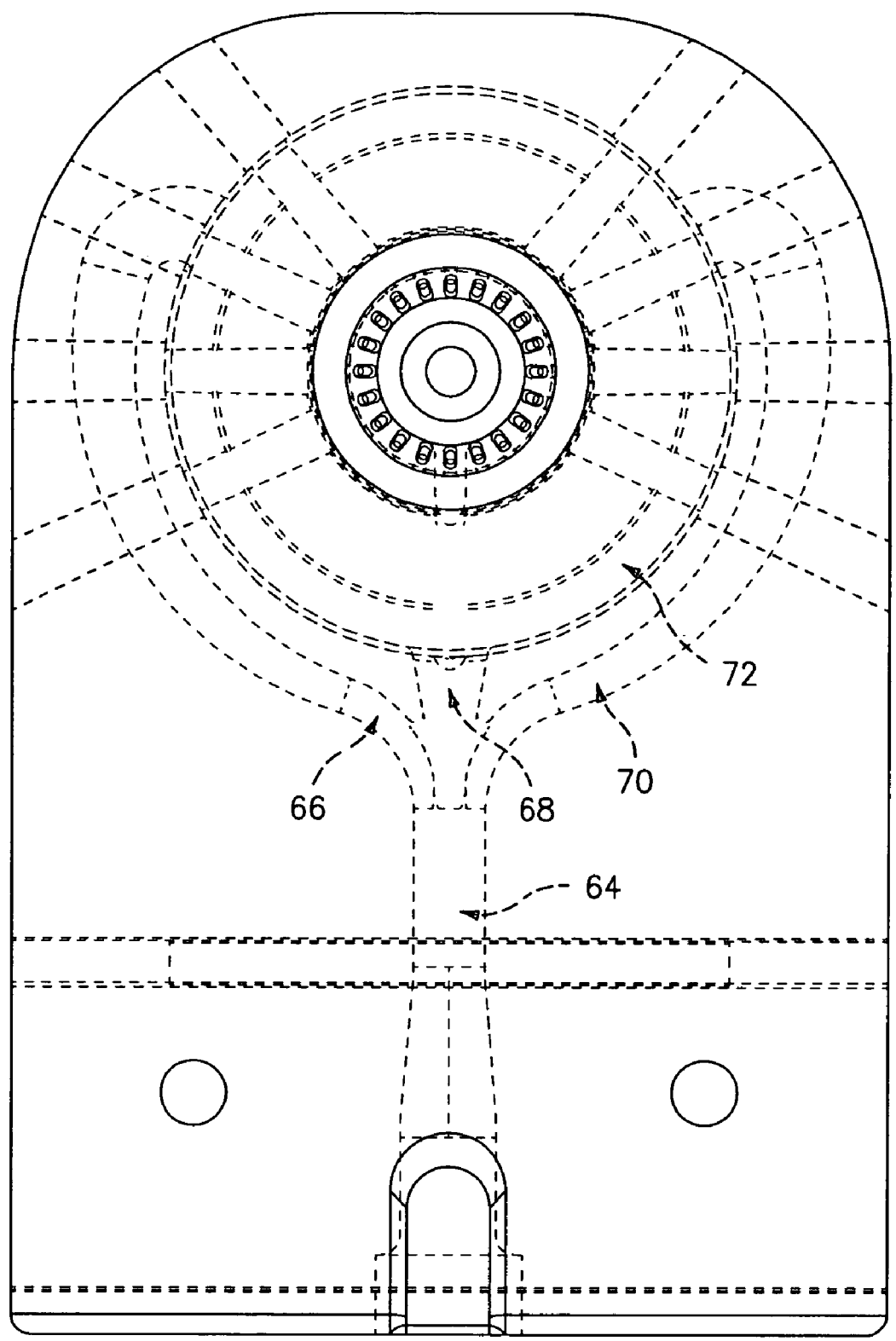
FIG. 3 is a front x-ray view of the nozzle of FIG. 1.
Figure 4:
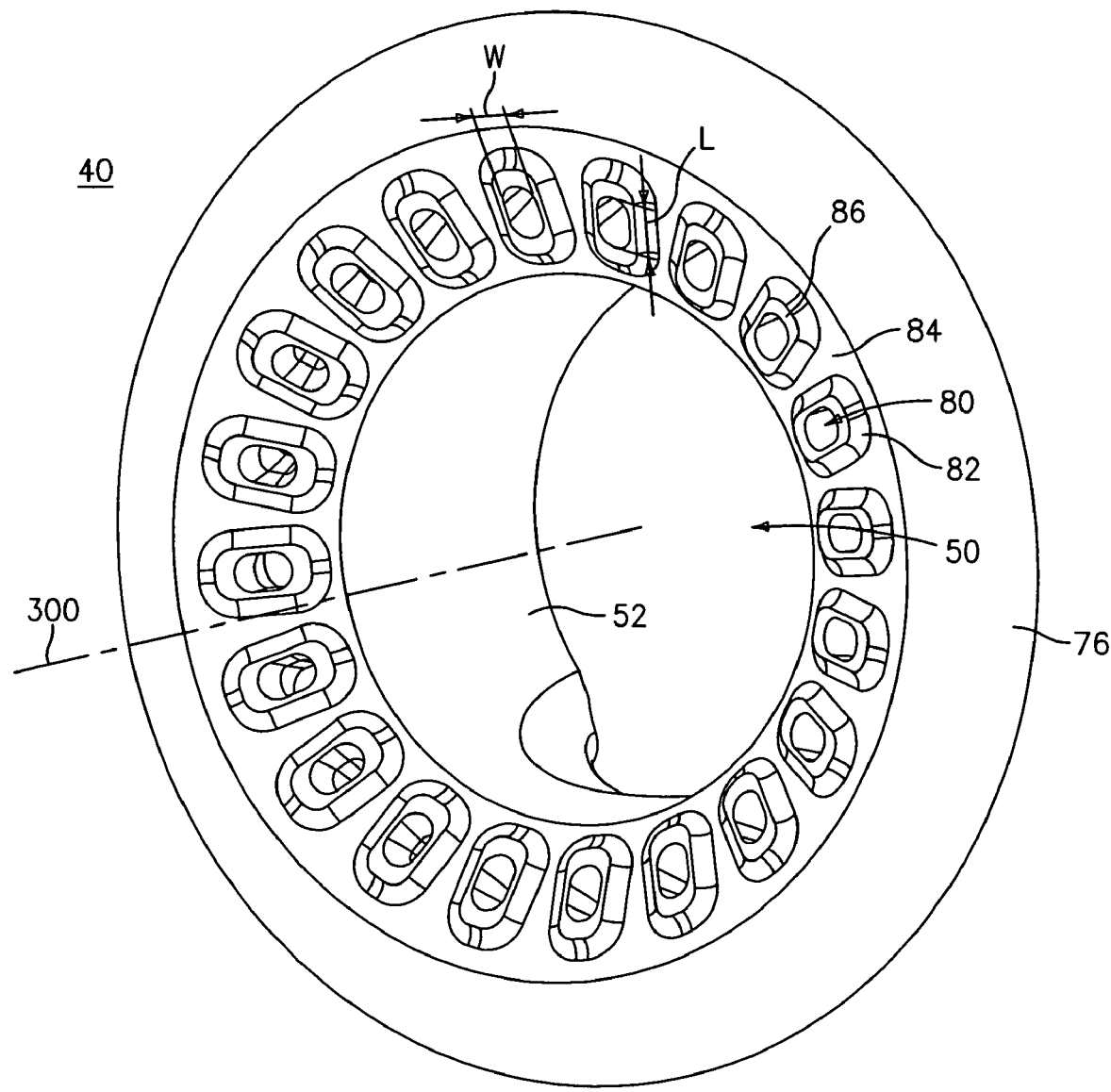
FIG. 4 is a view of a front nozzle boss of the nozzle of FIG. 1.
Figure 5:
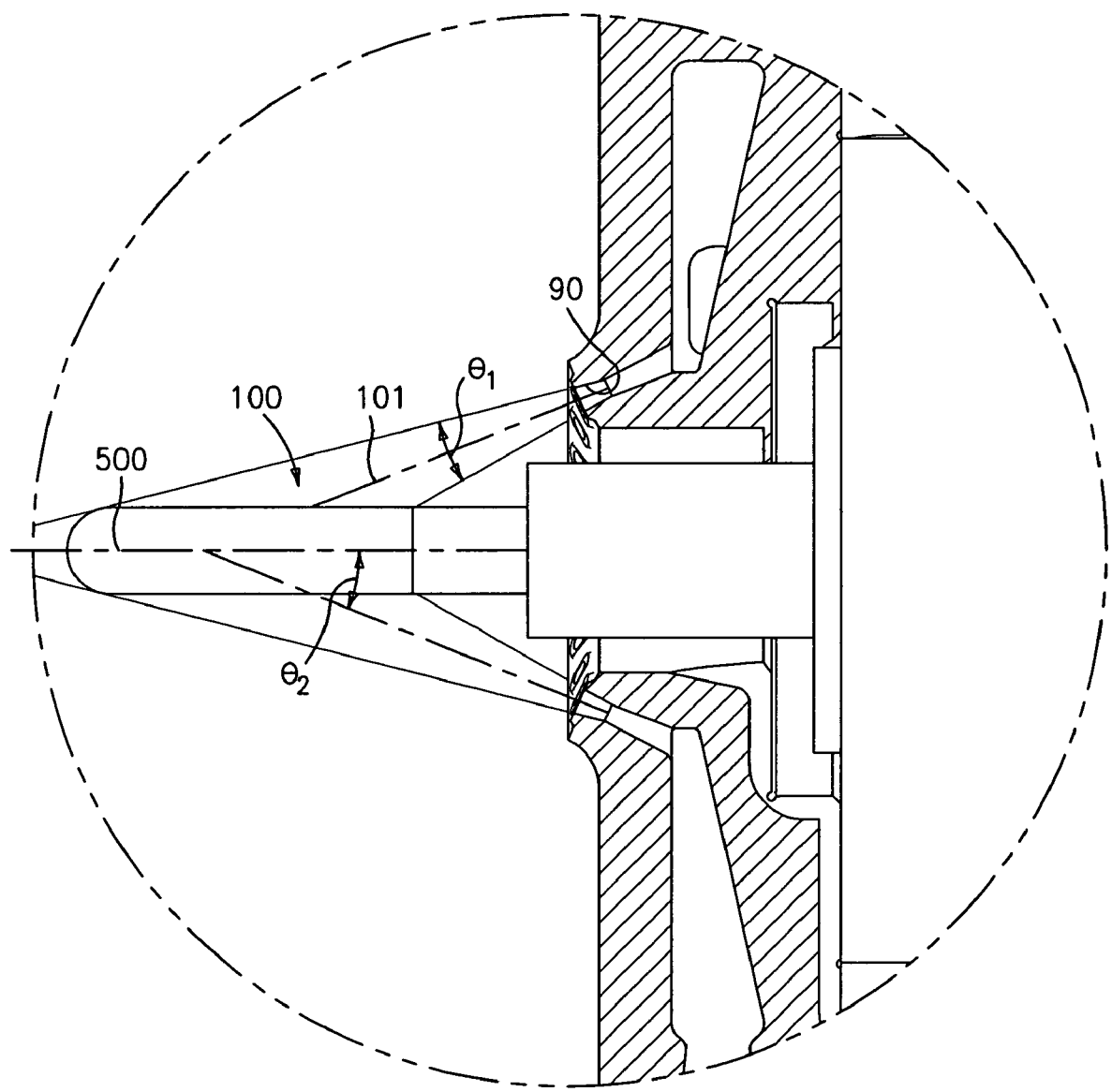
FIG. 5 an enlarged view of the nozzle taken along line 5-5 of FIG. 2.

A principal function of the nozzle is to introduce a cooling and/or lubricating fluid to the bit. At its lower end, the nozzle has with a fluid inlet 62 which feeds fluid to a trunk 64 of a fluid passageway network the respective portions of which are defined by associated internal surface portions of the nozzle. The trunk 64 feeds an exemplary three branches 66, 68, and 70 (FIG. 3). The branches feed a plenum 72 encircling the axis 500. The branch outlets to the plenum are spaced at approximately even 120° intervals so as to provide even introduction of fluid to the plenum. A circular array of outlet passageways 74 (FIG. 2) extend from the plenum to a nozzle boss 76 on the front surface 40 encircling the aperture 50 (FIG. 4). In the illustrated embodiment, each outlet passageway extends to an outlet 80 on an outlet boss 82 protruding from a slightly inwardly-facing frustoconical rim surface 84 of the nozzle boss 76. The outlet and a surrounding rim 86 are oriented facing forward and inward toward the axis 500. A terminal portion 90 of each outlet passageway is downstream divergent and elongate along a plane along the axis 500 so as to have a length L in such plane and a width W transverse thereto. Such a configuration produces a spray 100 that fans out at an approximate angle $\theta_1$ in such plane to impact the bit along the intermediate portion 30 with a centerline 101 at an acute angle $\theta_2$ to the axis 500. The angles $\theta_1$ and $\theta_2$ are chosen so that the sprays provide essentially total coverage along the length of the abrasive portion of the quill. The large number of outlets provides a highly redundant coverage around the circumference of the quill so that, during the machining operation, the effects of the workpiece blocking one or more of the sprays are minimized.

Figure 6:
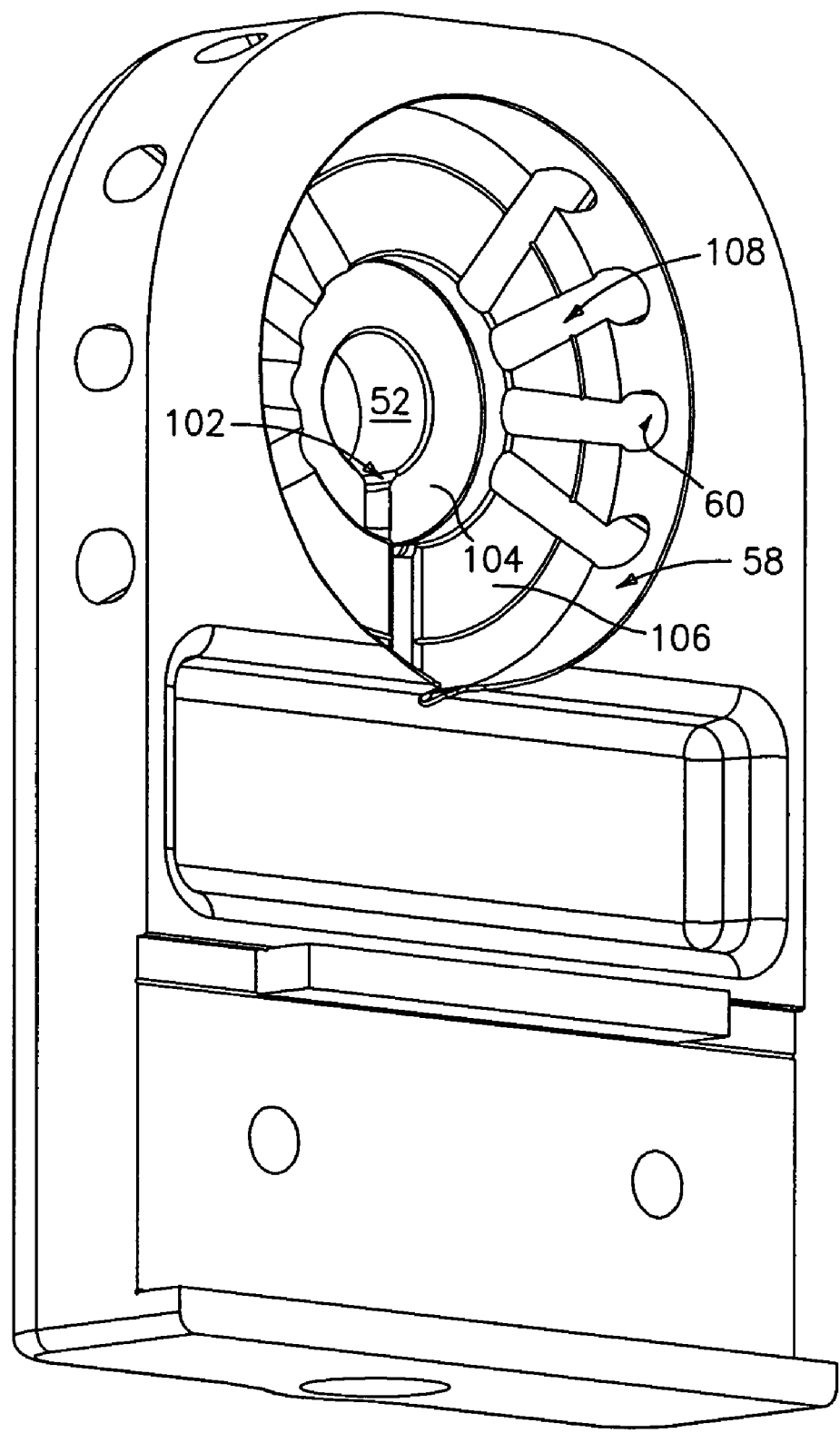
FIG. 6 is a rear perspective view of the nozzle of FIG. 1.

FIG. 6 shows further details of the exemplary nozzle. Along the bottom of the aperture 50, a depression 102 is formed in the surface 52 to serve as a drain. This depression extends downward along the stepped forward surface portions 104 and 106 of the recess 58 to permit drainage around the spindle. Similarly, the surface 106 is provided with open channel recesses 108 formed as continuations of the cooling passageways 60. These recesses help permit the outward ventilation of coolant mist.

In an exemplary method of manufacture, the nozzle is formed as a single unitary piece by selective laser sintering (SLS) of a ceramic. This can provide for quick and cost-effective manufacture, especially of small quantities. For ease of manufacture, strength, and distribution of the outlets, advantageously the nozzle circumscribes a full 360° around the aperture. This structure, for example, allows the plenum to similarly extend. However, there may be particular circumstances where this structure might not be utilized.

In the exemplary embodiment, the outlets are all of a given size and shape, and at a given radius from the axis 500 and are equally spaced about such axis. The illustrated nozzle includes twenty outlets. An exemplary broad range is two to forty outlets. Narrower ranges are five to thirty and ten to twenty-five.

One or more embodiments of the present invention have been described. Nevertheless, it will be understood that various modifications may be made without departing from the spirit and scope of the invention. For example, various details of the nozzle may be configured for use with particular machine tools, bits, and applications. In flank SAM applications, the outlets may be distributed so that their streams advantageously clear the workpiece being machined. This may involve uneven outlet distribution and/or greater overlap/redundancy in streams. Accordingly, other embodiments are within the scope of the following claims.

What is claimed is:

1. An apparatus comprising:
a machine tool;
an elongate abrasive bit carried by the machine tool; and
a nozzle, the nozzle comprising a sintered body having:
at least one coolant inlet;
a plurality of coolant outlets, no gap in either circumferential direction between sequentially adjacent ones of the outlets being more than 72°;
internal surface portions defining one or more passageways between the at least one coolant inlet the and at least one coolant outlet; and
an aperture accommodating the bit.

2. The apparatus of claim 1 wherein the sintered body is a single unitary piece.

3. The apparatus of claim 1 wherein the one or more passageways includes a plenum surrounding the aperture.

4. The apparatus of claim 1 wherein the plurality of coolant outlets are symmetric around an axis.

5. The apparatus of claim 1 wherein the plurality of coolant outlets are positioned to direct associated coolant outlet streams toward an axis of the bit when said bit is in an installed position.

6. The apparatus of claim 5 wherein the plurality of coolant outlets are elongate.

7. The apparatus of claim 5 wherein the plurality of coolant outlets comprises at least five outlets and the at least one coolant inlet is a single coolant inlet.

8. The apparatus of claim 1 wherein the aperture has a diameter of less than 3 cm.

9. The apparatus of claim 1 wherein the plurality of coolant outlets are angled to provide essentially total coverage along a length of an abrasive portion of the bit.

10. The apparatus of claim 1 wherein the plurality of coolant outlets provide a redundant coverage around the entire circumference of the bit so that, during a machining operation, the effects of a workpiece blocking one or more sprays of the coolant are limited.

11. The apparatus of claim 1 wherein the coolant is water based or comprises oil.

12. The apparatus of claim 1 wherein the one or more passageways include:
a feed trunk; and
a plenum between the feed trunk and the outlets.

13. An apparatus comprising:
a machine tool;
a rotating abrasive quill carried by the machine tool; and
a nozzle, the nozzle comprising a sintered body and having:
at least one coolant inlet;
at least one coolant outlet discharging a plurality of liquid coolant outlet streams impacting obliquely toward a tip of the quill along a side of the quill;
internal surface portions defining one or more passageways along essentially an entire circumference of the quill between the at least one coolant inlet and the at least one coolant outlet; and
an aperture accommodating the quill.

14. The apparatus of claim 13 formed of a sintered ceramic.

15. The apparatus of claim 13 wherein the at least one coolant outlet comprises at least five outlets and the at least one coolant inlet is a single coolant inlet.

16. The apparatus of claim 13 wherein the liquid coolant outlet streams have centerlines meeting the bit at an acute angle to a rotational axis of the bit.

17. An apparatus comprising:
a machine tool;
a rotating abrasive bit carried by the machine tool; and
a nozzle, the nozzle comprising a sintered body and having:
a through-aperture accommodating the bit;
a coolant inlet;
a plurality of coolant outlets at more than one angular position about the through-aperture and oriented to discharge associated coolant outlet streams and having circumferential spacing between each of the outlets and an associated first and second adjacent ones of the outlets on respective first and second sides of said outlet of no more than 72°; and
internal surface portions defining one or more passageways between the coolant inlet and the plurality of coolant outlets.

18. The apparatus of claim 17 wherein the bit is an elongate superabrasive quill.

19. The apparatus of claim 17 wherein the bit has a doubly convex head portion and a distal shaft portion which have an abrasive coating or embedded abrasive particles.

20. The apparatus of claim 17 having a sintered nozzle body.

* * * * *